J. B. Bolinger.
Treadle.
N° 93,955.　　　Patented Aug. 24, 1869.

Witnesses;
Geo. N. Mabee
Jno. H. Brooks

Inventor;
J. B. Bolinger

UNITED STATES PATENT OFFICE.

JOHN B. BOLINGER, OF DETROIT, MICHIGAN.

IMPROVEMENT IN TREADLES.

Specification forming part of Letters Patent No. 93,955, dated August 24, 1869.

*To all whom it may concern:*

Be it known that I, JOHN B. BOLINGER, of Detroit, in the couty of Wayne and State of Michigan, have invented a new and Improved Friction-Power; and I do hereby declare that the following is a full, clear, and exact description thereof, which will enable others skilled in the art to make and use the same, reference being had to the accompanying drawings, forming part of this specification.

The object of this invention is to provide an improved friction-power apparatus for attachment to treadles for propelling sewing and other light machines.

The invention consists in a peculiar construction and arrangement of a friction-pawl, grooved pulley, and loose pulley, the latter being arranged on the driving-shaft, and having an oscillating movement imparted to it by a treadle-belt and spring, in the usual way.

Figure 2:
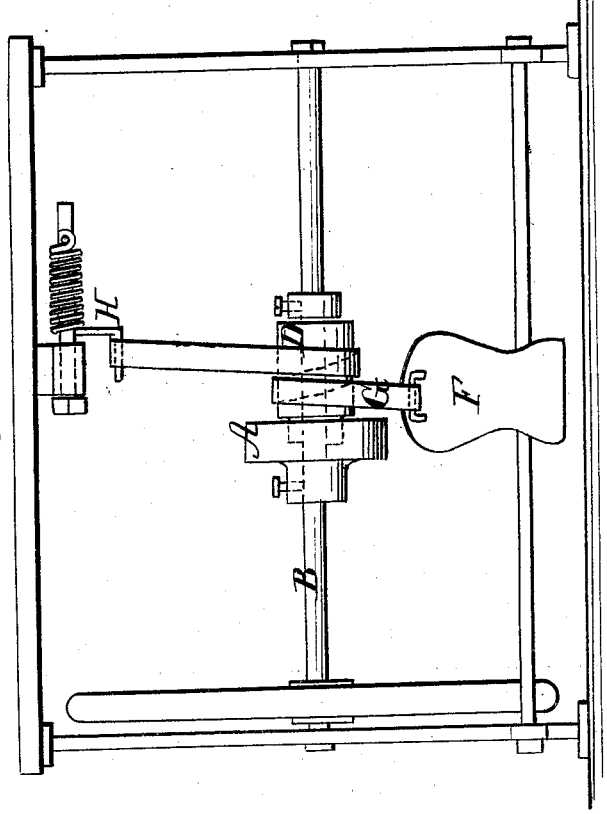
Figure 1:
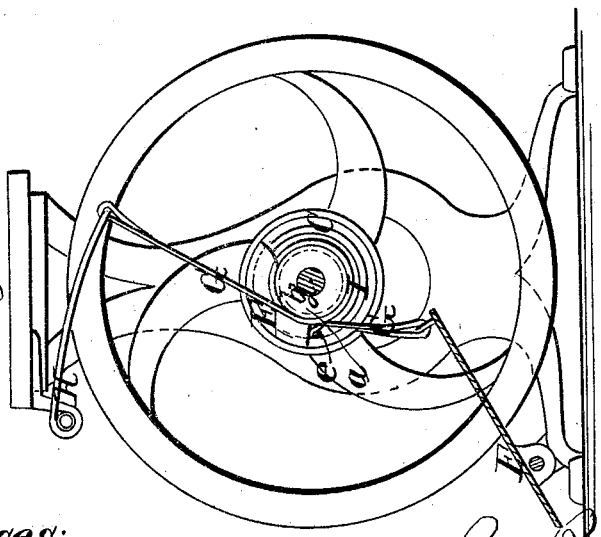

Figure 1 represents a side elevation of my improved apparatus, and Fig. 2 represents an end elevation of the same when applied to a sewing-machine.

Similar letters of reference indicate corresponding parts.

A represents a pulley or disk secured to the driving-shaft B, and provided with an annular groove, C, in the side. D represents a loose pulley working on the shaft E, on the side of the disk having the groove. This pulley has a recess in the face at the end near the disk, having one radial wall, *a*, and one eccentric wall, *b*. E represents a friction-pawl fitted at one end, *d*, to this recess, and curved over the eccentric wall *b* thereof around the hub or pulley D about a quarter of the circumference, and provided with a lateral projection at the outer end, taking into the groove C of the disk A. *e* represents a spring bearing against the lower end of the said friction-pawl, to keep it as high on the eccentric part of the recess in the pulley D as possible, and to take up any lost motion by wear of the said pawl.

When the pulley D is turned to the right, the friction of the pawl on the wheel A will tend to drive the pawl down into the recess in the pulley, entirely removing any frictional tendency of the pawl on the said wheel; but when it is turned to the left the natural tendency of the pawl and the effect of the spring are to cause the pawl to ride up the eccentric wall of the recess, and thereby to throw the lower end outward, whereby the lateral projection of the pawl is cramped in the groove C between the walls thereof, so as to have friction to carry the disk around.

F represents the treadle, and G the belt, which is wound once around the pulley and connected to the retracting-spring H. The belt is connected by a pin, I, to the shaft.

A toothed rack may be arranged to gear with teeth on the pulley D in substitution of the belt.

Having thus described my invention, I claim as new and desire to secure by Letters Patent—

1. The combination, with a treadle and belt, of a spring, H, arranged on a different side of the loose pulley, and diametrically opposite to the treadle, so that the action and reaction of the foot-power and spring will be entirely utilized, in the manner set forth.

2. The combination of a fast pulley, recessed on one of its side faces, and driven by a friction-lever, with the loose pulley D, having one concentric and one eccentric wall, whereby the said friction-lever is operated, as and for the purpose specified.

JOHN B. BOLINGER.

Witnesses:
THOMAS HILL,
A. DARROW.